(12) United States Patent
Tada et al.

(10) Patent No.: US 10,775,329 B2
(45) Date of Patent: Sep. 15, 2020

(54) THERMAL CONDUCTIVITY MEASUREMENT DEVICE AND THERMAL CONDUCTIVITY MEASUREMENT METHOD

(71) Applicant: Mitsubishi Electric Corporation, Chiyoda-ku, Tokyo (JP)

(72) Inventors: Haruna Tada, Tokyo (JP); Yasuyuki Sanda, Tokyo (JP); Dai Nakajima, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/461,594

(22) PCT Filed: Dec. 27, 2017

(86) PCT No.: PCT/JP2017/046879
§ 371 (c)(1),
(2) Date: May 16, 2019

(87) PCT Pub. No.: WO2018/131482
PCT Pub. Date: Jul. 19, 2018

(65) Prior Publication Data
US 2019/0369038 A1    Dec. 5, 2019

(30) Foreign Application Priority Data
Jan. 16, 2017    (JP) .................................. 2017-004826

(51) Int. Cl.
*G01N 25/18*    (2006.01)
*G01K 7/02*    (2006.01)
(Continued)

(52) U.S. Cl.
CPC .................................. *G01N 25/18* (2013.01)

(58) Field of Classification Search
USPC .................... 374/44, 110, 166, 141, 208, 179
See application file for complete search history.

(56) References Cited

U.S. PATENT DOCUMENTS 3,263,485 A * 8/1966 Mahmoodi ............ G01N 25/18
                                                      374/44
3,521,476 A * 7/1970 Day ....................... G01N 25/18
                                                      374/44
(Continued)

FOREIGN PATENT DOCUMENTS

EP    2418477 A1    2/2012
FR    2643717 A1 *  8/1990 ............. G01N 25/18
(Continued)

OTHER PUBLICATIONS

International Search Report (PCT/ISA/210) and Written Opinion (PCT/ISA/237) dated Mar. 13, 2018, by the Japan Patent Office as the International Searching Authority for International Application No. PCT/JP2017/046879.

*Primary Examiner* — Mirellys Jagan
(74) *Attorney, Agent, or Firm* — Buchanan Ingersoll & Rooney PC

(57) ABSTRACT

A thermal conductivity measurement device comprises: first and second clamping members which clamp an object; a heating member which has a contacting end surface which contacts a distal end surface of the first clamping member through a first axial correction member, and a distal end surface on the reverse side of the contacting end surface; a cooling member which has a contacting end surface which contacts a distal end surface of the second clamping member through a second axial correction member, and a distal end surface on the reverse side of the contacting end surface; a plurality of temperature sensors disposed on the clamping members; and a mechanism which applies a pressing force between the heating member and the cooling member. At (Continued)

least one surface of the first axial correction member and the second axial correction member has a convex curved shape, and the other surface is a flat surface.

20 Claims, 13 Drawing Sheets

(51) Int. Cl.
  *G01K 1/00* (2006.01)
  *G01K 13/00* (2006.01)

(56) References Cited

U.S. PATENT DOCUMENTS

| | | | | |
|---|---|---|---|---|
| 3,733,887 | A * | 5/1973 | Stanley | G01N 25/18 374/44 |
| 4,630,938 | A * | 12/1986 | Piorkowska-Palczewska | G01N 25/18 374/29 |
| 5,667,301 | A * | 9/1997 | Jurkowski | G01N 25/18 374/43 |
| 5,940,784 | A * | 8/1999 | El-Husayni | G01N 25/18 374/43 |
| 6,116,777 | A * | 9/2000 | Pause | G01N 33/36 374/43 |
| 6,142,662 | A * | 11/2000 | Narh | G01N 25/18 374/29 |
| 6,331,075 | B1 * | 12/2001 | Amer | G01N 25/18 374/44 |
| 6,742,926 | B1 * | 6/2004 | Fesmire | G01N 25/18 374/34 |
| 6,896,405 | B2 * | 5/2005 | Osone | G01N 25/18 374/43 |
| 7,445,379 | B2 * | 11/2008 | Chang | G01N 25/20 374/142 |
| 7,517,140 | B2 * | 4/2009 | Cervantes | G01N 25/18 374/7 |
| 2003/0072349 | A1 | 4/2003 | Osone et al. | |
| 2006/0045165 | A1 * | 3/2006 | Chan | G01N 3/60 374/43 |
| 2018/0299391 | A1 | 10/2018 | Sanda et al. | |

FOREIGN PATENT DOCUMENTS

| | | |
|---|---|---|
| JP | H06024766 A | 2/1994 |
| JP | 3858660 B2 | 12/2006 |
| JP | 2008309729 A | 12/2008 |
| JP | 2009233727 A | 10/2009 |
| JP | 2011102768 A | 5/2011 |
| JP | 2012032196 A | 2/2012 |
| JP | 5379760 B2 | 12/2013 |
| JP | 5509195 B2 | 6/2014 |

* cited by examiner

THERMAL CONDUCTIVITY MEASUREMENT DEVICE AND THERMAL CONDUCTIVITY MEASUREMENT METHOD

TECHNICAL FIELD

The present invention relates to a thermal conductivity measurement apparatus and a thermal conductivity measurement method for measuring thermal conductivity of a material.

BACKGROUND ART

Various apparatuses are conventionally known as an apparatus measuring a thermophysical property value (particularly thermal conductivity) of an object to be measured such as a resin material and a metallic material and a contact thermal resistance between members of a resin material or a metallic material by a steady state method (Patent Documents 1 to 5).

A thermophysical property measurement apparatus using a steady state method employs a configuration in which an object to be measured is sandwiched between a heating-side holding member connected to a heating part and a cooling-side holding member connected to a cooling part. The heating-side holding member and the cooling-side holding member are configured such that temperature can be measured at multiple positions, and a measured temperature gradient is used for obtaining a thermophysical property value (such as thermal conductivity) of an object to be measured and a contact thermal resistance between the members.

PRIOR ART DOCUMENTS

Patent Documents

Patent Document 1: Japanese Patent No. 5379760
Patent Document 2: Japanese Patent No. 3858660
Patent Document 3: Japanese Laid-Open Patent Publication No. 2008-309729
Patent Document 4: Japanese Laid-Open Patent Publication No. 2011-102768
Patent Document 5: Japanese Patent No. 5509195

SUMMARY OF THE INVENTION

Problem to be Solved by the Invention

A thermophysical property (thermal conductivity, contact thermal resistance, etc.) measurement apparatus using a steady state method maintains a state in which an object to be measured is sandwiched between a heating-side holding member provided with multiple temperature measurement mechanisms and a cooling-side holding member provided with multiple temperature measuring mechanisms and allows heat to pass from the heating-side holding member connected to a heat source through the object to be measured to the cooling-side holding member connected to a cooling source in one direction so as to calculate a thermophysical property (such as thermal conductivity) of the object to be measured from temperature measured at temperature measurement points disposed in both holding members. When the contact thermal resistance is calculated between the members, the heating-side holding member and the cooling-side holding member are brought into contact with each other while a pressing force is applied without sandwiching the object to be measured, and the contact thermal resistance is calculated from the temperature measured at the temperature measurement points disposed in both holding members.

To ensure the measurement accuracy of the thermophysical property value of the object to be measured, a flow of heat passing through the heating-side holding member, the object to be measured, and the cooling-side holding member in this order must be prevented from being spatially biased.

In the measurement apparatus described above, by disposing the object to be measured in a normal state between the heating-side holding member and the cooling-side holding member, i.e., by disposing the object such that the heating-side holding member, the object to be measured, and the cooling-side holding member are vertically arranged along a heat passage direction (vertical direction), the heat can pass through the heating-side holding member, the object to be measured, and the cooling-side holding member without bias of the flow of heat.

On the other hand, if the object to be measured is disposed in a non-normal disposition state between the heating-side holding member and the cooling-side holding member, i.e., if the heating-side holding member, the object to be measured, and the cooling-side holding member are tilted from the heat passage direction (vertical direction), the flow of passing heat is spatially biased and, as a result, the thermophysical property value of the object to be measured cannot precisely be measured.

To detect an abnormality of disposition of the heating-side holding member, the object to be measured, and the cooling-side holding member, for example, Patent Document 1 discloses a system that is provided with a mechanism capable of measuring a temperature variation in an in-plane direction of the holding members in a direction parallel to surfaces of the heating-side holding member and the cooling-side holding member coming into contact with the object to be measured and that detects the temperature variation in the in-plane direction equal to or greater than a certain value as an abnormality of disposition.

However, adding the system detecting an abnormality of disposition of the heating-side holding member, the object to be measured, and the cooling-side holding member makes the apparatus more complicated and increases costs. Additionally, since an operation must be performed with sufficient attention given to a disposition state and an abnormality cannot be detected unless measurement is started, the measurement takes time depending on the disposition state, resulting in deterioration in efficiency of the measurement. Another problem is that the thermophysical property value of the object to be measured cannot precisely be measured due to a set threshold value of the temperature variation in some cases.

An object of the present invention is to provide a thermal conductivity measuring apparatus capable of shortening a setting time and an adjustment time of measurement and efficient and highly accurate in measurement.

Means for Solving Problem

An aspect of the present invention provides
a thermal conductivity measurement device comprising:
a first holding member including a contact end face coming into contact with an object to be measured and a distal end face disposed on the side opposite to the contact end face;
a second holding member including a contact end face coming into contact with the object to be measured and a distal end face disposed on the side opposite to the contact end face, the second holding member holding the object to be measured together with the first holding member;

a heating member including an abutting end face that abuts on the distal end face of the first holding member across a first axis correction member including two opposite faces and a distal end face disposed on the side opposite to the abutting end face, the heating member heating the first holding member;

a cooling member including an abutting end face that abuts on the distal end face of the second holding member across a second axis correction member including two opposite faces and a distal end face disposed on the side opposite to the abutting end face, the cooling member cooling the second holding member;

a plurality of temperature sensors disposed in the first holding member and the second holding member; and a pressing force applying mechanism applying a pressing force between the heating member and the cooling member wherein at least one face of the first axis correction member and the second axis correction member is a curved face having a convex curved shape, while the other face is a flat face that is flat.

Another aspect of the present invention provides a thermal conductivity measurement device comprising:

a first holding member including a contact end face coming into contact with an object to be measured and a distal end face disposed on the side opposite to the contact end face;

a second holding member including a contact end face coming into contact with the object to be measured and a distal end face disposed on the side opposite to the contact end face, the second holding member holding the object to be measured together with the first holding member;

a heating member including an abutting end face that faces the distal end face of the first holding member and heating the first holding member;

a cooling member including an abutting end face that faces the distal end face of the second holding member and cooling the second holding member;

an axis correction member sandwiched at least between the distal end face of the first holding member and the abutting end face of the heating member or between the distal end face of the second holding member and the abutting end face of the cooling member and including two faces facing the distal end face and the abutting end face; and a plurality of temperature sensors disposed in the first holding member and the second holding member, wherein at least one face of the axis correction member is a curved face having a convex curved shape.

Another aspect of the present invention provides a thermal conductivity measurement device comprising:

a first holding member including a contact end face coming into contact with an object to be measured and a distal end face disposed on the side opposite to the contact end face;

a second holding member including a contact end face coming into contact with the object to be measured and a distal end face disposed on the side opposite to the contact end face, the second holding member holding the object to be measured together with the first holding member;

a heating member including an abutting end face that faces the distal end face of the first holding member and heating the first holding member;

a cooling member including an abutting end face that faces the distal end face of the second holding member and cooling the second holding member;

an axis correction member sandwiched at least between the distal end face of the first holding member and the abutting end face of the heating member or between the distal end face of the second holding member and the abutting end face of the cooling member and including two faces facing the distal end face and the abutting end face; and a plurality of temperature sensors disposed in the first holding member and the second holding member, wherein at least one face of the axis correction member is a curved face having a convex curved shape, while the other face is a flat face that is flat.

Another aspect of the present invention provides a thermal conductivity measurement method comprising the steps of:

preparing the thermal conductivity measurement device;

sandwiching the object to be measured between the first holding member and the second holding member;

applying a pressing force between the heating member and the cooling member by the pressing force applying mechanism;

heating the first holding member with the heating member and cooling the second holding member with the cooling member; and measuring temperatures of the first holding member and the second holding member with the temperature sensors to detect the thermal conductivity of the object to be measured.

According to the present invention, since the first axis correction member and the second axis correction member are respectively sandwiched between the first holding member and the heating member and between the second holding member and the cooling member, and the first axis correction member and the second axis correction member have at least one face that is a curved face having a convex curved shape and the other face that is a flat surface, the axes of the three members, i.e., the heating-side holding member, the object to be measured, and the cooling-side holding member, can be made coincident with each other simply by applying the pressing force without special adjustment, so that the temperature variation can significantly be suppressed in the in-plane direction of the object to be measured. Therefore, the setting time and the adjustment time of the measurement can be shortened, and the efficient and highly-accurate measurement can be performed.

DESCRIPTION OF THE PREFERRED EMBODIMENTS

First Embodiment

Figure 1:
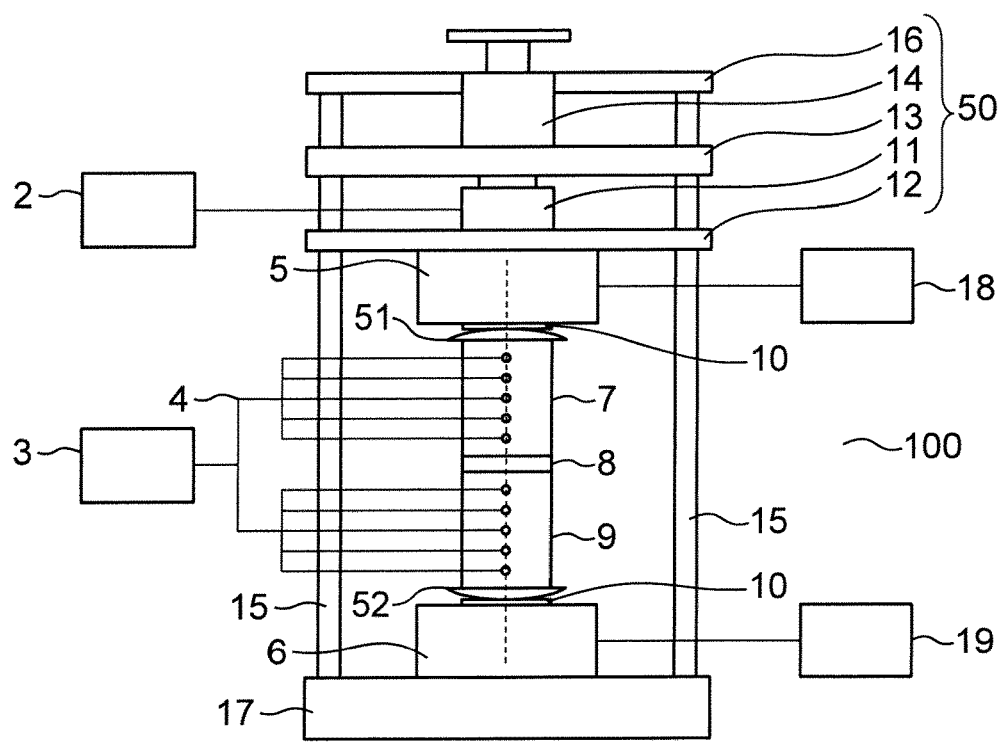
FIG. 1 is a configuration diagram of a thermal conductivity measurement device according to a first embodiment of the present invention.

FIG. 1 is a configuration diagram of a thermal conductivity measurement device according to a first embodiment of the present invention, generally denoted by 100. In a thermal conductivity measurement device 100, a heating-side holding member 7 and a cooling-side holding member 9 holding an object to be measured 8 are sandwiched between a heating block unit 5 and a cooling block unit 6 so that a pressing force can be applied by a pressing force adjusting screw 14.

The heating-side holding member 7 and the cooling-side holding member 9 are configured to have the same shape by using the same material and are formed into a three-dimensional shape, for example, a rectangular columnar shape or a circular columnar shape, having a contact end face coming into contact with the object to be measured 8 and a distal end face opposite to the contact end face. The contact end face and the distal end face are flat surfaces parallel to each other. A material having relatively high thermal conductivity, for example, copper or aluminum is used as the material, so that a thermophysical property of the object to be measured 8 can accurately be measured. Other usable materials include aluminum alloy, stainless steel, etc.

The heating block unit 5 is made of a material having relatively high thermal conductivity, for example, copper or aluminum, and is made up of a metal block having an abutting end face abutting on the distal end face of the heating-side holding member 7 via a heating-side axis correction member 51, a heating element, for example, a ceramic heater or a cartridge heater, etc. The metal block has a function of diffusing heat to make temperature uniform, and a thermal conductive grease for reducing a contact thermal resistance is applied to a joint position with the heating element as needed. The heating element is connected to a heating block unit control device 18 for controlling an amount of heat generation.

The cooling block unit 6 is made of a material having relatively high thermal conductivity, for example, copper or aluminum, and has a metal block having an abutting end face abutting on the distal end face of the cooling-side holding member 9 via a cooling-side axis correction member 52, a cooing element, for example, a water cooling unit, a Peltier element, or a combination of a heat sink and a cooling fan, etc. The metal block has a function of diffusing heat to make temperature uniform, and a thermal conductive grease for reducing a contact thermal resistance is applied to a joint position with the cooling element as needed. The cooling element is connected to a cooling block unit control device 19 for controlling an amount of heat discharge.

The heating-side axis correction member 51 and the cooling-side axis correction member 52 are made of a material having relatively high thermal conductivity such as copper or aluminum so that the heat generated in the heating block unit can efficiently be conducted to the heating-side holding member. Additionally, the heat conducted through the heating-side holding member 7 and the object to be measured 8 to the cooling-side holding member 9 can efficiently be discharged via the cooling block unit 6.

The thermal conductivity measurement device 100 according to the first embodiment of the present invention has the heating-side axis correction member 51 and the cooling-side axis correction member 52 having a flat plate shape and sandwiched and held between the heating-side holding member 7 and the heating block unit 5 and between the cooling-side holding member 9 and the cooling block unit 6, respectively. The heating-side axis correction member 51 and the cooling-side axis correction member 52 may be removable.

The heating-side axis correction member 51 has an end face having a planar R shape (convex cylindrical face) or a spherical R shape (convex spherical face) on the heating block unit 5 side. Similarly, the cooling side shaft correction member 52 has an end face having a planar R shape or a spherical R shape on the cooling block unit 6 side. The surfaces facing the planar R shape or the spherical R shape are preferably relatively flat as compared to the R face, and this enables more accurate measurement.

Preferably, the heating-side axis correction member 51 covers the entire distal end face of the heating-side holding member 7, and the vertex of the planar R shape is disposed on the central axis of the heating-side holding member 7. The same applies to the cooling-side axis correction member 52.

To reduce the contact thermal resistance, thermal conductive grease 10 is applied between the metal block of the heating block unit 5 and the heating-side axis correction member 51 and between the cooling-side axis correction member 52 and the metal block of the cooling block unit 6.

In such a configuration, the heat generated by the heating block unit 5 is transferred through the heating-side axis correction member 51 to the heating-side holding member 7, transferred through the object to be measured 8 to the cooling-side holding member 9, and discharged through the cooling-side axis correction member 52 from the cooling block unit 6. When the heat passes through in a constant direction in this way, a temperature gradient is formed according to the thermal conductivity of the members and a difference in the contact thermal resistance between the members.

The side faces of the heating-side holding member 7 and the cooling-side holding member 9 have multiple holes formed along the longitudinal direction. Thermocouples 4 are inserted in the holes as temperature sensors and fixed such that temperature measurement points coincide with axes of the heating-side holding member 7 and the cooling-side holding member 9. These multiple thermocouples 4 enable measurement of temperature distribution corresponding to vertical positions. The measured values are input to a temperature measurement device 3, so that the temperature can constantly be monitored. From these measured values, an amount of heat passing through the object to be measured 8 can be calculated so as to calculate the thermophysical property value of the object to be measured 8 and the contact thermal resistance between the members. Such an arithmetic function may be built into the temperature measurement device 3 or may be built into an external computer connected through a network.

The cooling block unit 6 is disposed at the center of a base 17. Multiple (in FIG. 1, two) shafts 15 are disposed at end portions of the base 17. A support plate 12 is disposed above the base 17 so as to be vertically displaceable while being guided by the shaft 15. The heating block unit 5 is attached to the support plate 12. An upper plate 16 is fixed to upper ends of the shafts 15. By providing the multiple shafts 15 as described above, vertical alignment can be ensured among the heating block unit 5, the heating-side axis correction member 51, the heating-side holding member 7, the object to be measured 8, the cooling-side holding member 9, the cooling-side axis correction member 52, and the cooling block unit 6.

The thermal conductivity measurement device 100 further includes a pressing force adjustment mechanism 50 for adjusting a pressing force applied to the object to be measured 8 via the heating-side holding member 7 and the cooling-side holding member 9. The pressing force adjustment mechanism 50 is made up of the support plate 12 disposed on an upper portion of the heating block unit 5 and supporting the heating block unit 5, a load cell 11 disposed on the support plate 12 for monitoring the pressing force, a spacer 13 disposed on the load cell 11 for transferring the pressing force to the load cell 11, and the pressing force adjustment screw 14 fixed to the upper plate 16 for applying the pressing force via the spacer 13 to the load cell 11. The pressing force measured by the load cell 11 is input to a measurement control device 2 so that the pressing force can constantly be monitored.

A method of adjusting a pressing force will be described. When the thermophysical property of the object to be measured 8 is measured, the heat applied from the heating block unit 5 passes through the heating-side axis correction member 51, the heating-side holding member 7, the object to be measured 8, the cooling-side holding member 9, and the cooling-side axis correction member 52 and reaches the cooling block unit 6. Due to the passing heat, the temperature rises in the members, i.e., the heating block unit 5, the heating-side axis correction member 51, the heating-side holding member 7, the object to be measured 8, the cooling-side holding member 9, the cooling-side axis correction member 52, and the cooling block unit 6. As the temperature rises in the members, the members expand, and the pressing force applied to the load cell 11 changes during measurement. Since the pressing force applied to the object to be measured 8 must be controlled to a constant force in the thermophysical property measurement of the object to be measured 8, it is necessary to adjust the pressing force adjustment screw 14 depending on a displayed pressing force. It is noted that the thermophysical property of the object to be measured can accurately be measured when variations from a predetermined pressing force are within ±5%, or preferably, variations from a predetermined pressing force are within ±1%. Therefore, the "constant pressing force" of the present invention means the variations from a predetermined pressing force within the range of ±5%, more preferably ±1%. Thus, it is preferable to provide a pressing force control device adjusting the pressing force adjustment screw 14 through feedback of the pressing force applied to the load cell 11 so as to automatically control the pressing force to a predetermined constant value. This enables elimination of manual work and automation of measurement. The support plate 12 and the spacer 13 are desirably made of sufficiently rigid metal.

Figure 2:
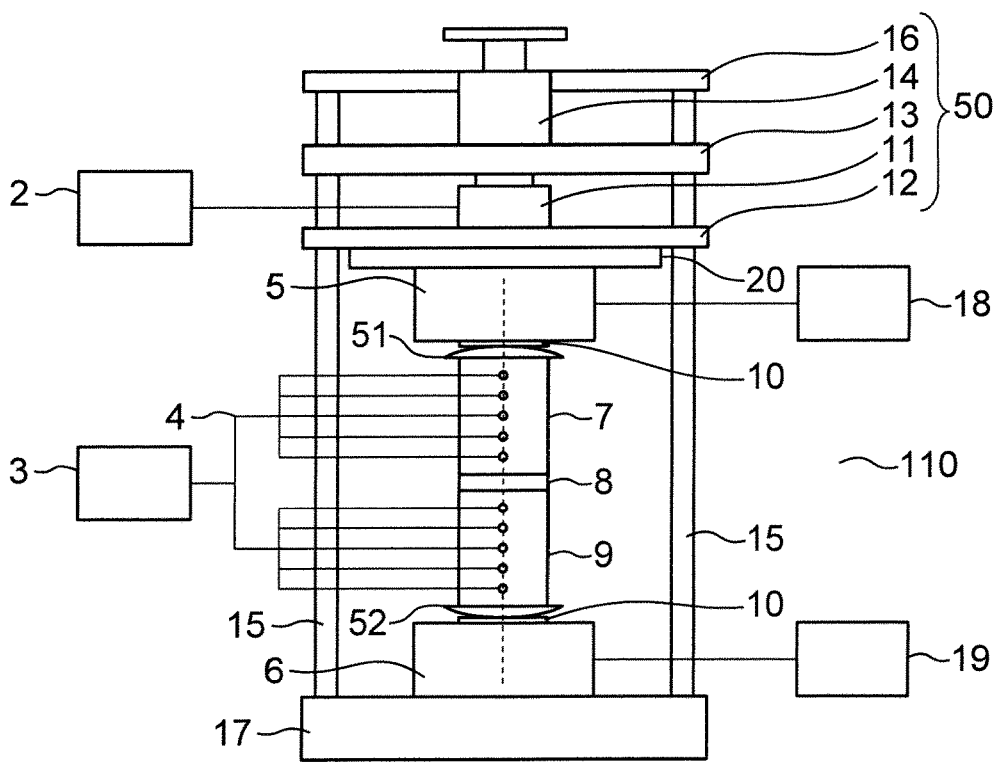
FIG. 2 is a configuration diagram of another thermal conductivity measurement device according to the first embodiment of the present invention.

As shown in a thermal conductivity measurement device 110 of FIG. 2, a heat insulating plate 20 may be disposed between the heating block unit 5 and the support plate 12. This can reduce an amount of heat transferred from the heating block unit 5 to the support plate 12 to increase the amount of heat transferred to the object to be measured 8.

When the thermophysical property of the object to be measured 8 is measured, thickness information of the object to be measured 8 is also important. As shown in a thermal conductivity measurement device 210 of FIG. 3, a thickness display device 21 may be disposed that can measure and display a total thickness of the heating-side axis correction member 51, the heating-side holding member 7, the object to be measured 8, the cooling-side holding member 9, and the cooling-side axis correction member 52 in the measurement state. The thickness display device 21 is formed by using a laser range finder, an optical scale, a magnetic scale, etc. However, the device may be disposed at another position as long as the thickness of the object to be measured 8 can be calculated by using a position and a mechanism without using the position shown in FIG. 3. By preliminarily measuring the thickness of the heating-side holding member 7, the cooling-side holding member 9, the heating-side axis correction member 51, and the cooling-side axis correction member 52 with slide calipers, a micrometer, etc., the thickness of the object to be measured 8 can more precisely be calculated from the thickness displayed on the thickness display device 21.

Figure 3:
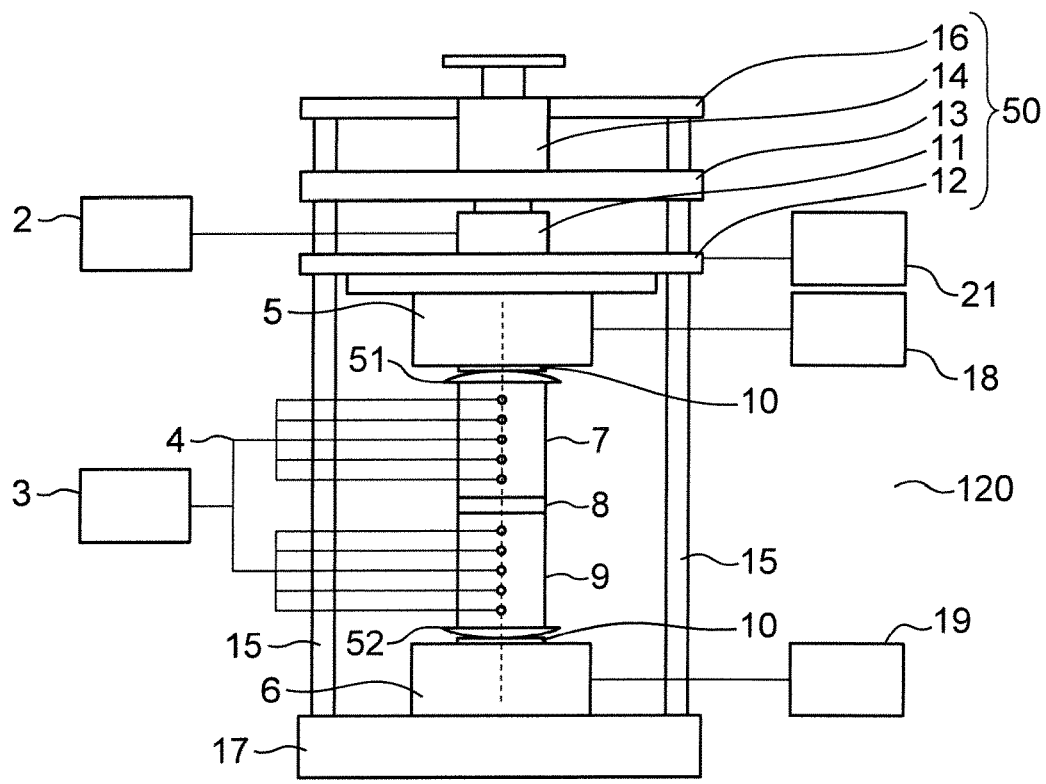
FIG. 3 is a configuration diagram of another thermal conductivity measurement device according to the first embodiment of the present invention.

The configurations of FIGS. 2 and 3 are also applicable to thermal conductivity measurement devices described in second to fifth embodiments.

The heating-side holding member 7 and the cooling-side holding member 9 are formed into a circular columnar shape having a diameter of 10 mm to 30 mm and a height of 30 to 100 mm, so that the thermophysical property value of the object to be measured 8 and the contact thermal resistance between the members can precisely and accurately be measured. The shapes of the heating-side holding member 7 and the cooling-side holding member 9 are not limited thereto, and the same effect can be obtained also from a shape of a rectangular column etc. The faces (contact end faces) of the heating-side holding member 7 and the cooling-side holding member 9 coming into contact with the object to be measured 8 are processed into flat faces, and the surface roughness of the processed faces preferably have smaller Ra. In experiments, the thermophysical property of the object to be measured 8 can precisely be measured when the faces are finished to a level of Ra=0.8. However, the surface roughness is not limited to this value.

The object to be measured 8 is inserted and fixed between the contact end faces of the heating-side holding member 7 and the cooling-side holding member 9. When the object to be measured 8 is a fluid, the object is adjusted to a specified thickness by a dispenser and screen printing and is applied between the heating-side holding member 7 and the cooling-side holding member 9. The heating-side holding member 7 and the cooling-side holding member 9 may be fixed by the viscosity force or the adhesion force of the object to be measured 8 itself or may be fixed by using an auxiliary member such as an adhesive tape.

To reduce heat dissipation due to heat transfer from the surfaces of the heating-side holding member 7 and the cooling-side holding member 9 to the air, a heat insulating material may be wrapped around the holding members 7, 9. When the thermophysical property of the object to be measured 8 is measured, the heating-side holding member 7 and the cooling-side holding member 9 with the object to be measured 8 sandwiched therebetween are integrally disposed on the cooling block unit 6 via the cooling-side axis correction member 52, and the heating block unit 5 is then disposed thereon via the heating-side axis correction member 51.

In this case, even if the pressing force adjustment screw 14 of the pressing force adjustment mechanism is not tightened, a pressing force is applied due to the weight of the members, particularly, the heating block unit 5. It is noted that tightening the pressing force adjusting screw 14 of the pressing force adjusting mechanism is more preferable. As a result, a constant pressing force is applied to the heating-side axis correction member 51, the heating-side holding member 7, the object to be measured 8, the cooling-side holding member 9, and the cooling-side axis correction member 52, and the measurement of the thermophysical property is started in this state.

In FIG. 1, the thermal conductive grease 10 is applied between the metal block of the heating block unit 5 and the heating-side axis correction member 51 and between the metal block of the cooling block unit 6 and the cooling-side axis correction member 52; however, the thermal conductive grease may also be applied between the heating-side axis correction member 51 and the heating-side holding member 7 and between the cooling-side holding member 9 and the cooling-side axis correction member 52.

As described above, the distal end face of the heating-side axis correction member 51 in contact with the heating block unit 5 and the distal end face of the cooling-side axis correction member 52 in contact with the cooling block unit 6 have a planar R shape or a spherical R shape; however, only one of the heating-side axis correction member 51 and the cooling-side axis correction member 52 may have a planar R shape or a spherical R shape. The other end faces such as the contact end faces for contact between the shaft correction members 51, 52 and the holding members 7, 9 have a planar shape.

Figure 5:
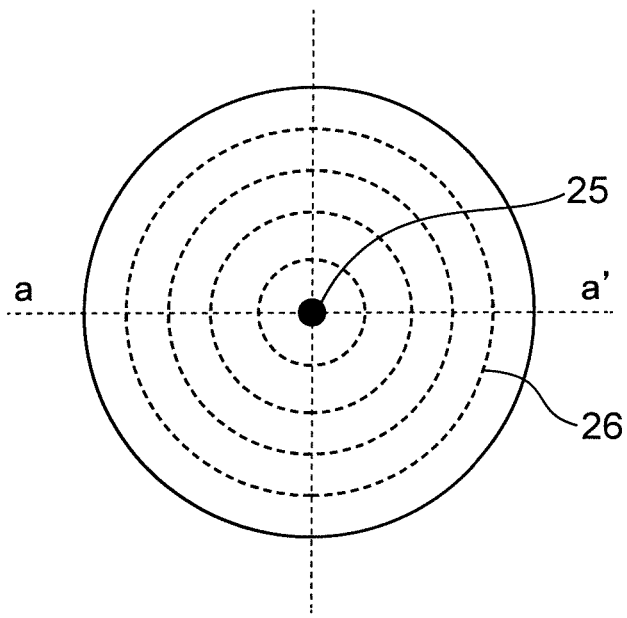
FIG. 5 is a diagram of isotherms in a holding member when measurement can accurately be performed.

In a conventional structure, the heating-side axis correction member 51 and the cooling-side axis correction member 52 are not included, and the distal end faces of the holding members 7, 9 are flat. Therefore, to precisely measure the thermophysical property of the object to be measured 8, when heat passes through the heating-side holding member 7, the object to be measured 8, and the cooling-side holding member 9, the temperature distribution in an in-plane direction (a plane perpendicular to axes) of the heating-side holding member 7 and the cooling-side holding member 9 must allow the heat to pass through symmetrically about the axial center without bias as shown in an isotherm graph of FIG. 5 so that a temperature variation in the plane is made as small as possible. In this graph, reference numeral 25 denotes a temperature measurement point of the thermocouple 4, and reference numeral 26 denotes an isotherm of a specific temperature.

To allow the heat to pass from the heating block unit 5 through the axial centers of the heating-side holding member 7, the object to be measured 8, the cooling-side holding member 9, and the cooling block unit 6, it is necessary to dispose the heating-side holding member 7, the object to be measured 8, and the cooling-side holding member 9 such that the axes of these three members coincide with each other, i.e., such that the axial centers of the heating-side holding member 7 and the cooling-side holding member 9 as well as the center axis of the object to be measured 8 are on a straight line.

However, as compared to the heating block unit 5 and the cooling block unit 6, the heating-side holding member 7 and the cooling-side holding member 9 are small, and therefore, when a pressing force is applied by adjusting the pressing force adjustment screw 14 to the members, i.e., the heating-side holding member 7, the object to be measured 8, and the cooling-side holding member 9, a deviation may occur among the axes of the three members, i.e., the heating-side holding member 7, the object to be measured 8, and the cooling-side holding member 9. Actually, considering the parallelism and flatness of the abutting end face of the heating member and the abutting end face of the cooling member manufactured by machining, surface treatment, etc., the axes of the three members, i.e., the heating-side holding member 7, the object to be measured 8, and the cooling-side holding member 9, are not on a straight line and are usually deviated to no small extent although magnitude may differ.

Figure 4:
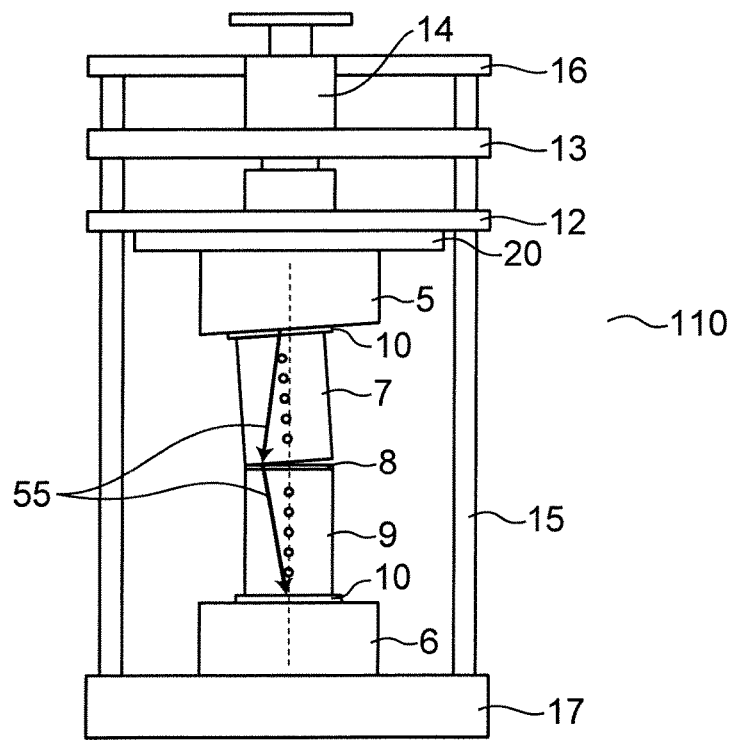
FIG. 4 is an explanatory diagram showing a state in which an object to be measured and holding members are tilted.

FIG. 4 shows an example thereof in which the parallelism of the metal block of the heating block unit 5 is not achieved, i.e., the case that the lower surface of the metal block is not horizontal. If a pressing force is applied when the parallelism of the metal block of the heating block unit 5 is not achieved, the distal end face of the heating-side holding member 7 follows the abutting end face of the metal block without the parallelism achieved, so that the abutting end face of the heating-side holding member 7 comes into partial contact with the object to be measured 8.

Figure 6:
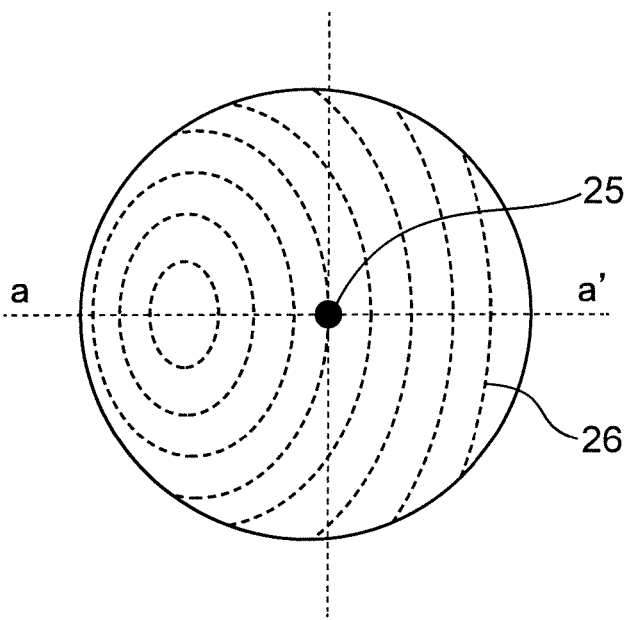
FIG. 6 is a diagram of isotherms in a holding member when measurement cannot accurately be performed.

When the abutting end face of the heating-side holding member 7 comes into partial contact with the object to be measured 8 as shown in FIG. 4, a thermal flux passing through the heating-side holding member 7, the object to be measured 8, and the cooling-side holding member 9 is not symmetric about the axial center and is biased toward one side as indicated by arrows 55. Consequently, as shown in FIG. 6, the heat passes through the heating-side holding member 7, the object to be measured 8, and the cooling-side holding member 9 while being biased from the center, which makes the temperature variation larger in the in-plane direction of the object to be measured 8, so that the thermophysical property of the object to be measured 8 cannot precisely be measured. Therefore, to precisely measure the thermophysical property of the object to be measured 8, it is necessary to perform confirmation and adjustment so that the parallelism is achieved in each of the heating block unit 5 coming into contact with the heating-side holding member 7 and the cooling block unit 6 coming into contact with the cooling-side holding member 9. In this case, skillful work is required, which makes a setting time and an adjustment time for measurement longer.

Alternatively, it is conceivable that a unit measuring a thermal bias in the members is added to make a correction corresponding to the measured thermal bias through calculation without the adjustment work. In this case, complicated calculations are required, and the measurement accuracy may be reduced.

Figure 7:
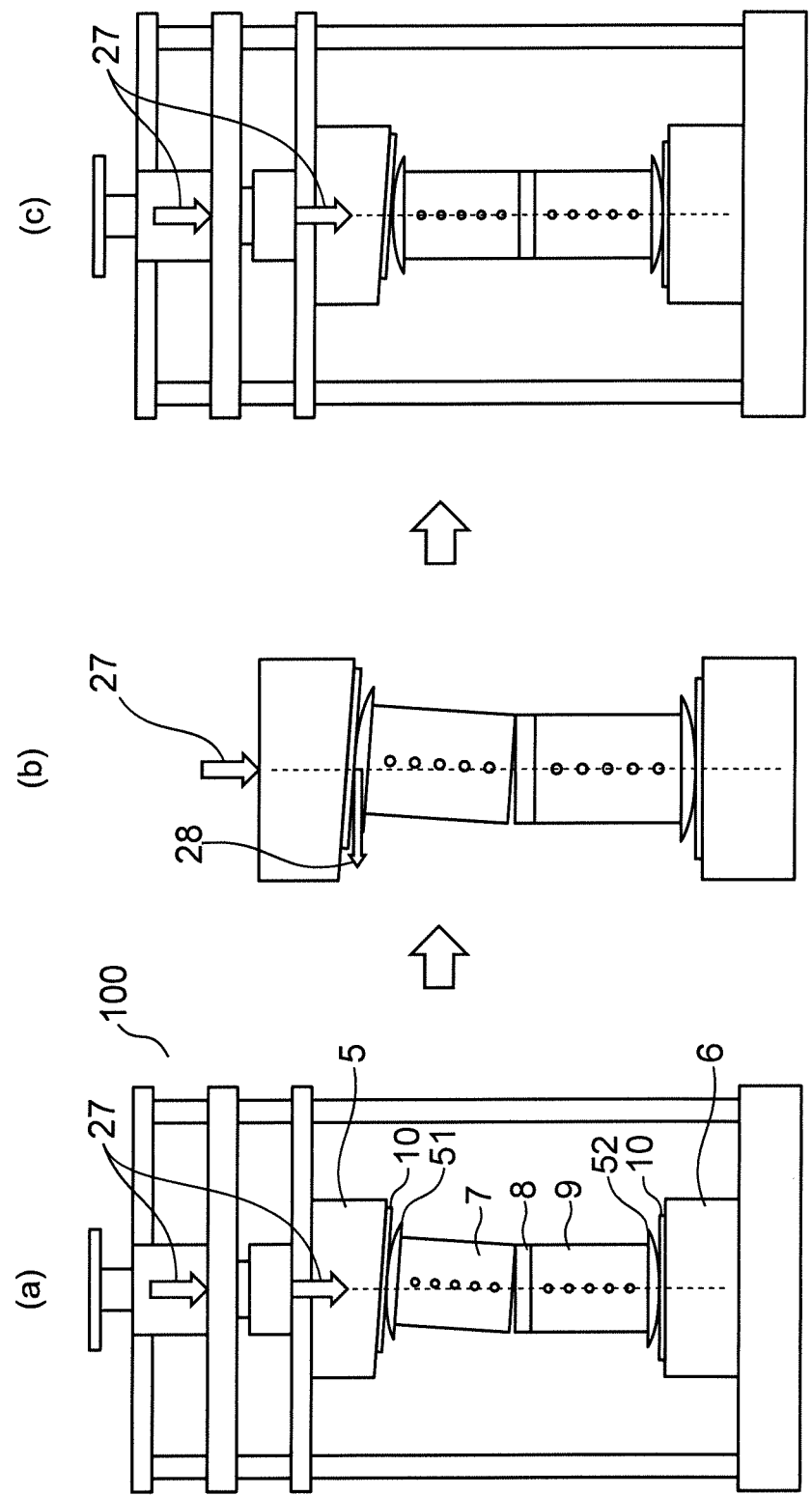
FIG. 7 is an explanatory view showing an effect of the present invention when the heating-side holding member is tilted since a parallelism of a metal block of a heating block unit is not achieved.

FIG. 7 shows an example in which the present invention is applied when the parallelism of the abutting end face of the metal block of the heating block unit 5 is not achieved. As shown in FIG. 7(*a*), since the parallelism of the abutting end face of the heating block unit 5 is not achieved in the initial stage of application of the pressing force, the heating-side holding member 7 is tilted, coming into partial contact with the object to be measured 8. In this case, the heat flux passing through the heating-side holding member 7, the object to be measured 8, and the cooling-side holding member 9 is biased and the temperature variation in the in-plane direction of the object to be measured 8 is large, so that the thermophysical property of the object to be measured 8 cannot precisely be measured.

However, in the thermal conductivity measurement device 100, the distal end faces of the heating-side holding member 7 and the cooling-side holding member 9 are provided with the heating-side axis correction member 51 and the cooling-side axis correction member 52 having a planar R shape (convex cylindrical face) or a spherical R shape (convex spherical face) facing toward the block units 5, 6. Therefore, when the heating-side holding member 7 and the cooling-side holding member 9 sandwiching the object to be measured 8 are sandwiched between the cooling block unit 6 and the heating block unit 5 via the heating-side axis correction member 51 and the cooling-side axis correction member 52, respectively, and a pressing force is applied by the pressing force adjustment screw 14, the heating-side axis correction member 51 and the cooling-side axis correction member 52 having the planar R shape or the spherical R shape attempt to achieve a stable posture as shown in FIG. 7(*b*), so that a motion following the surface of the heating block unit 5 naturally occurs. Reference numeral 27 denotes a pressing force vector applied from the pressing force adjustment screw 14. Reference numeral 28 denotes a horizontal pressing force vector acting on the curved surface of the heating-side axis correction member 51 when the pressing force is applied.

Because of this motion, as shown in FIG. 7(*c*), the axes of the three members, i.e., the heating-side holding member 7, the object to be measured 8, and the cooling-side holding member 9, can be made coincident with each other simply by applying the pressing force by the pressing force adjustment screw 14 without special adjustment, and the heat can pass axially symmetrically through the heating-side holding member 7, the object to be measured 8, and the cooling-side holding member 9 (see FIG. 5), so that the temperature variation can significantly be reduced in the in-plane direction of the object to be measured 8. As a result, the thermophysical property of the object to be measured 8 can precisely be measured simply by applying the pressing force without special adjustment.

In this embodiment, the heating-side axis correction member 51 and the cooling-side axis correction member 52 are provided with the curved surfaces having the planar R shape (convex cylindrical face) or the spherical R shape (convex spherical face) facing toward the block units 5, 6 so as to minimize the frictional force acting when the members attempt to be in a stable posture during application of the pressing force, and to maximize the pressing force vector generated due to the pressing force.

To ensure higher measurement accuracy, it is desirable to increase the amount of heat passing through the heating-side holding member 7, the object to be measured 8, and the cooling-side holding member 9 to make the measurement temperature at the thermocouples higher, i.e., to make the temperature gradient greater. This is because the influence of the measurement temperature variation in the thermocouples (e.g., ±1.5° C. in the case of K thermocouples, Class 1) can be suppressed by increasing the amount of passing heat to make the measurement temperature at the thermocouples higher. If the amount of passing heat is small and the temperature gradient is small, this measurement temperature variation considerably affects the thermophysical property of the object to be measured.

If the thickness of the thermal conductive grease 10 is thick, the thermal resistance of the thermal conductive grease becomes large, and therefore, preferably, the thermal conductive grease 10 is thinly applied.

In experiments, the heating-side holding member 7 and the cooling-side holding member 9 were shaped into a rectangular column having a cross section of 40 mm×40 mm and a height of 50 mm, and the heating-side axis correction member 51 and the cooling-side axis correction member 52 having a spherical 81050 shape (a convex shape with a radius R of 1050 mm) were respectively disposed on the distal end faces of the heating-side holding member 7 and the cooling-side holding member 9. As a result, the thermophysical property values of the object to be measured 8 and the contact thermal resistance between the members were precisely measurable.

Regarding the size of the radius R, a difference between a height of a central portion of R and a height of a peripheral portion must be at least larger than the flatness of the object to be measured 8. However, if the difference of the height is too large, the contact of the heating-side axis correction member 51 and the cooling-side axis correction member 52 with the block units 5, 6 is brought into a state close to point contact, so that heat flows passing through the holding members 7, 9 are not parallel. Therefore, preferably, the difference between the height of the central portion of R and the height of the peripheral portion is ten times or less, preferably several times or less, with respect to a particle diameter of a filler contained in the thermal conductive grease 10. As a result, the heat flows passing through the holding members 7, 9 become substantially parallel, and the measurement accuracy can be increased.

Figure 8:
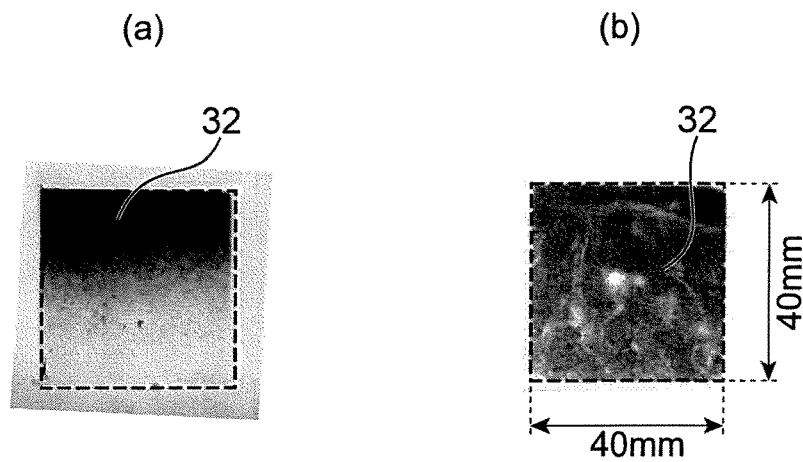
FIG. 8 is an explanatory view showing a contact state on a distal end face of the holding member, showing (a) partial contact and (b) entire surface contact.

FIG. 8 shows a state of contact between the heating-side holding member 7 and the object to be measured 8 in the case of using the heating-side holding member 7 and the cooling-side holding member 9 having the cross section of 40 mm×40 mm and the height of 50 mm in the thermal conductivity measurement device 100 of FIG. 7. FIG. 8(*a*) and FIG. 8(*b*) show the case of not disposing and the case of disposing, respectively, the heating-side axis correction member 51 and the cooling-side axis correction member 52 on distal end portions. A dark color portion indicates a contact portion, and a color strength indicates a contact strength. In FIG. 8(*a*), an upper portion has a dark black color, and it can be seen that a strong partial contact is occurring in the upper portion. In contrast, in FIG. 8(*b*), the whole area has a light black color, and it can be seen that the whole area is making uniform contact.

Although the object to be measured 8 is sandwiched between the heating-side holding member 7 and the cooling-side holding member 9 to measure the thermophysical property value of the object to be measured 8 is measured in the above description, additionally, the present invention produces a great effect also in measurement in a state without sandwiching the object to be measured 8. Specifically, this is the case that the pressing force and the contact thermal resistance between the members are calculated by using only the heating-side holding member 7 and the cooling-side holding member 9 without sandwiching the object to be measured 8. When the contact thermal resistance is calculated, a state of contact between the heating-side holding member 7 and the cooling-side holding member 9 significantly affects a measurement result. By disposing the heating-side axis correction member 51 and the cooling-side axis correction member 52 on the distal end faces of the heating-side holding member 7 and the cooling-side holding member 9 as in the present invention, as shown in FIG. 8, an ideal contact state is acquired such that both members come into uniform contact without special adjustment. By measuring the contact thermal resistance in this state, the contact thermal resistance can efficiently and accurately be measured.

The thermal conductive grease 10 has a certain thickness defined by a filler contained therein and a thermal conductivity of about several W/mK and therefore has a certain level of thermal resistance. However, since the heat flux is calculated in terms of the amount of heat passing through the object to be measured by using the multiple thermocouples shown in the figures in this thermal conductivity measurement method, no influence of the thermal conductive grease 10 appears in the measurement object. Therefore, highly accurate measurement can be performed.

Specifically, the thermal conductivity measurement is calculated from a difference in temperature of the top and bottom of the object to be measured 8 estimated from the measured temperatures of the thermocouples 4 attached to the heating-side holding member 7 and the cooling-side holding member 9 as well as an amount of passing heat that can be estimated from the measured temperatures of the multiple thermocouples 4 attached to one or both of the heating-side holding member 7 and the cooling-side holding member 9. First, regarding the temperature of the top and bottom of the object to be measured 8, when the relationship between the distance from the surface of the object to be measured 8 and the temperature is shown in a graph from the measured temperatures of the thermocouples 4 attached at regular intervals to the heating-side holding member 7, temperatures of measurement points are in a relationship proportional to the distance from the surface of the object to be measured 8. Therefore, the surface temperature of the object to be measured 8 can easily be calculated from the temperatures of the measurement points and the distance from the surface of the object to be measured 8. The same applies to the cooling-side holding member 9 side. From the difference between these temperatures, the difference in temperature of the top and bottom of the object to be measured 8 is obtained.

Regarding the amount of passing heat, for example, when a measured temperature difference LT of the thermocouples 4 disposed in the heating-side holding member 7, a distance L between the thermocouples 4, a cross-sectional area A of the heating-side holding member 7, and a thermal conductivity A of the heating-side holding member 7 are known, the amount of passing heat is easily obtained from Formula 1 below:

$$\Delta T \times L / A / \lambda \qquad (1).$$

Therefore, the thermal conductive grease 10 attached to the heating-side holding member 7 and the cooling-side holding member 9 on the side opposite to the object to be measured 8 does not affect the measurement result.

Although the heating-side axis correction member 51 and the cooling-side axis correction member 52 are respectively sandwiched between the heating block unit 5 and the heating-side holding member 7 and between the cooling block unit 6 and the cooling-side holding member 9 in the specific example described in the first embodiment of the present invention, either one may be included.

However, even if the machining accuracy of the holding members 7, 9 is low on the end faces facing toward the object to be measured 8 and the two end faces are not exactly parallel planes, the influence of the machining accuracy can be absorbed by disposing the axis correction members 51, 52 on both members to obtain the high measurement accuracy. Additionally, when the thermal resistance of a plurality of members integrated by swaging etc., this effect is further exerted. Even if machining accuracy is high in respective members before integration, a tilt is caused in the integrated members in various levels depending on a relationship of tolerance and a placement state of the members at the time of integration, a device used, etc. Therefore, if it is attempted to directly measure the integrated members, the partial contact occurs, so that the thermophysical property of the members cannot accurately be measured. By disposing the heating-side axis correction member 51 and the cooling-side axis correction member 52 on the distal end faces of the heating-side holding member 7 and the cooling-side holding member 9 as in the present invention, the partial contact can be prevented, and the measurement accuracy can be increased even in the integrated members.

Although the first embodiment of the present invention has been described with a specific example used for measurement of thermal conductivity, the present invention can obviously be used for measurement of thermal resistance.

Second Embodiment

Figure 9:
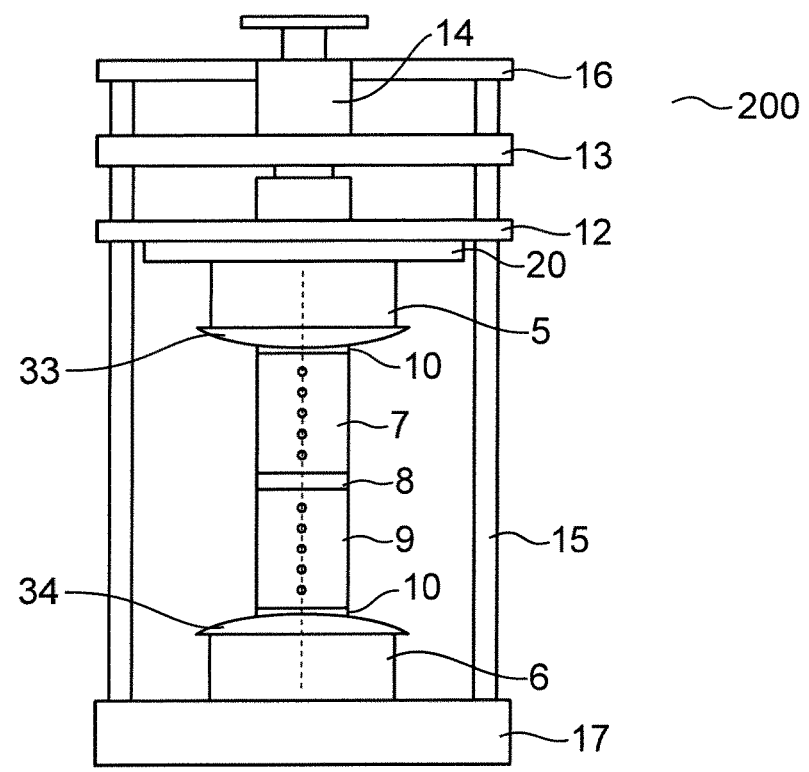
FIG. 9 is a configuration diagram of a thermal conductivity measurement device according to a second embodiment of the present invention.

FIG. 9 is a configuration diagram of a thermal conductivity measurement device according to the second embodiment of the present invention, generally denoted by 200. In FIG. 9, the same reference numerals as FIG. 2 denote the same or corresponding portions.

The thermal conductivity measurement device 200 includes a heating-side axis correction member 33 and a cooling-side axis correction member 34 instead of the heating-side axis correction member 51 and the cooling-side axis correction member 52, respectively, of the thermal conductivity measurement device 110 according to the first embodiment. The other structure is the same as the thermal conductivity measurement device 110.

The heating-side axis correction member 33 and the cooling-side axis correction member 34 provides a planar shape for the distal end faces of the heating-side holding member 7 and the cooling-side holding member 9, while providing a planar R shape (a convex cylindrical surface) or a spherical R shape (a convex spherical surface) for the abutting end faces of the heating block unit 5 and the cooling block unit 6, thereby suppressing the temperature variation in the in-plane direction of the object to be measured 8. In this case, the heating-side axis correction member 33 and the heating block unit 5 as well as the cooling-side axis correction member 34 and the cooling block unit 6 are fixed by a viscosity force or an adhesion force of grease or fixed by using an auxiliary member such as an adhesive tape.

In the thermal conductivity measurement device 200 according to the second embodiment of the present invention, due to the R shapes formed on the axis correction members 33, 34, when the heating-side holding member 7, the object to be measured 8, the cooling-side holding member 9 sandwiching the object to be measured 8 are placed on the cooling block unit 6 and a pressing force is applied via the heating block unit 5 by the pressing force adjustment screw 14, the axes of the three members, i.e., the heating-side holding member 7, the object to be measured 8, and the cooling-side holding member 9, can be made coincident with each other simply by applying the pressing force by the pressing force adjustment screw 14 without special adjustment, and the heat passes through the axial centers of the heating-side holding member 7, the object to be measured 8, and the cooling-side holding member 9, so that the thermophysical property of the object to be measured 8 can precisely be measured.

Regarding the size of the radius R of the heating-side axis correction member 33 and the cooling-side axis correction member 34, as in the first embodiment, a difference between the height of the central portion of R and the height of the peripheral portion must be at least larger than the flatness of the object to be measured 8. However, if the difference of the height is too large, the contact between the heating-side axis correction member 33 and the heating-side holding member 7 and between the cooling-side axis correction member 34 and the cooling-side holding member 9 is brought into a state close to point contact, so that heat flows passing through the holding members 7, 9 are not parallel. Therefore, preferably, the difference between the height of the central portion of R and the height of the peripheral portion is ten times or less, preferably several times or less, with respect to a particle diameter of a filler contained in the thermal conductive grease 10. As a result, the heat flows passing through the holding members 7, 9 become substantially parallel, and the measurement accuracy can be increased.

Although the distal end faces of the axis correction members 33, 34 are flat in FIG. 9, the distal end faces may have a planar R shape or a spherical R shape. By using the axis correction members 33, 34 having the distal end faces formed into the planar R shape and the spherical R shape, the measurement accuracy can be increased.

Third Embodiment

Figure 10:
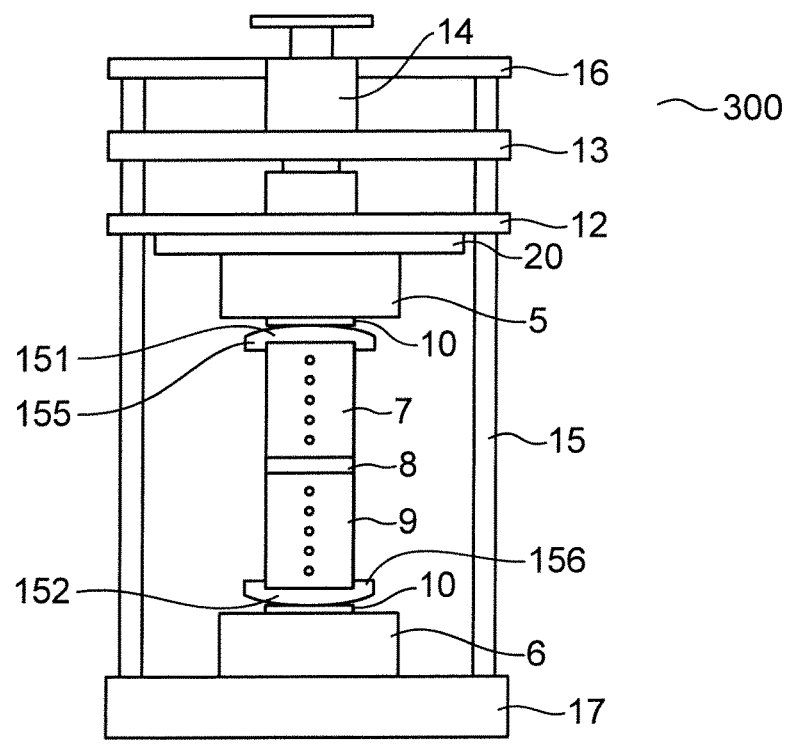
FIG. 10 is a configuration diagram of a thermal conductivity measurement device according to a third embodiment of the present invention.

FIG. 10 is a configuration diagram of a thermal conductivity measurement device according to the third embodiment of the present invention, generally denoted by 300. In FIG. 10, the same reference numerals as FIG. 2 denote the same or corresponding portions.

The thermal conductivity measurement device 300 includes a heating-side axis correction member 151 and a cooling-side axis correction member 152 instead of the heating-side axis correction member 51 and the cooling-side axis correction member 52, respectively, of the thermal conductivity measurement device 110 according to the first embodiment. The other structure is the same as the thermal conductivity measurement device 110.

As shown in FIG. 10, the heating-side axis correction member 151 has a structure in which convex protruding portions 155 in contact with the side surface of the heating-side holding member 7 are included on both sides of the heating-side axis correction member 51 of the first embodiment. Similarly, the cooling-side axis correction member 152 has a structure in which convex protruding portions 155 in contact with side surface of the cooling-side holding member 9 are included on both sides of the cooling-side axis correction member 52.

Since the heating-side axis correction member 151 and the cooling-side axis correction member 152 have the protruding portions 155, 156 as described above, a positional deviation of a placement location can be prevented when the object to be measured 8 sandwiched between the holding members 7, 9 is placed in the thermal conductivity measurement device 300. As a result, a placement time can be shortened, and measurement can be performed with high accuracy.

Figure 11:
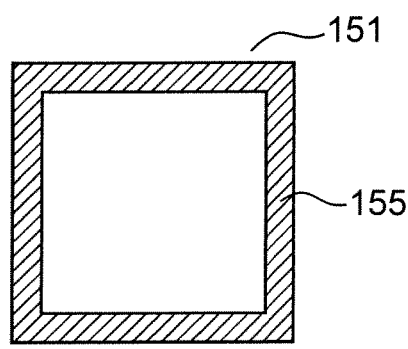
FIG. 11 is a plan view of a heating-side axis correction member according to the third embodiment of the present invention.

Although the heating-side axis correction member 151 and the cooling-side axis correction member 152 each have a pair of (two) protruding portions on both sides in FIG. 10, the number and shape of the protruding portions are not limited thereto. FIG. 11 is a plan view of the heating-side axis correction member 151 used when the heating-side holding member 7 is a rectangular column as viewed from the heating-side holding member 7 side. A portion indicated by hatched lines is the protruding portion 155, and the protruding portion 155 is disposed to surround the distal end portion of the heating-side holding member 7.

Figure 12:
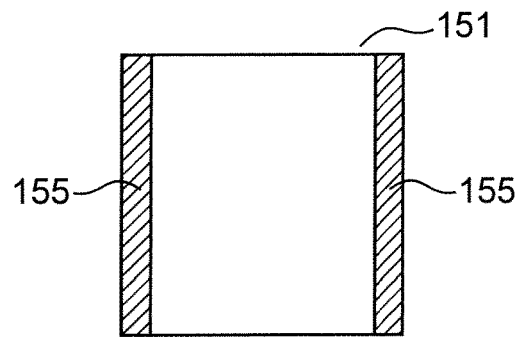
FIG. 12 is a plan view of another heating-side axis correction member according to the third embodiment of the present invention.

FIG. 12 is a plan view of another heating-side axis correction member 151 used when the heating-side holding member 7 is a rectangular column as viewed from the heating-side holding member 7 side. The portions indicated by hatched lines are the protruding portions 155, and the protruding portions 155 are disposed to sandwich both sides of the heating-side holding member 7.

Although FIGS. 11 and 12 show the heating-side axis correction member 151 disposed on the heating-side holding member 7 side, the cooling-side axis correction member 152 disposed on the cooling-side holding member 9 side may have the same shape.

The third embodiment has been described with a specific example in the case that the object to be measured 8 is sandwiched between the heating-side holding member 7 and the cooling-side holding member 9 to measure the thermophysical property of the object to be measured; however, even in the case of measurement of the contact thermal resistance between the members etc. without sandwiching the object to be measured 8, a setting step can be facilitated by including such protruding portions. Although a specific example used for measurement of thermal conductivity has been described, the present invention can obviously be used for measurement of thermal resistance.

Fourth Embodiment

Figure 13:
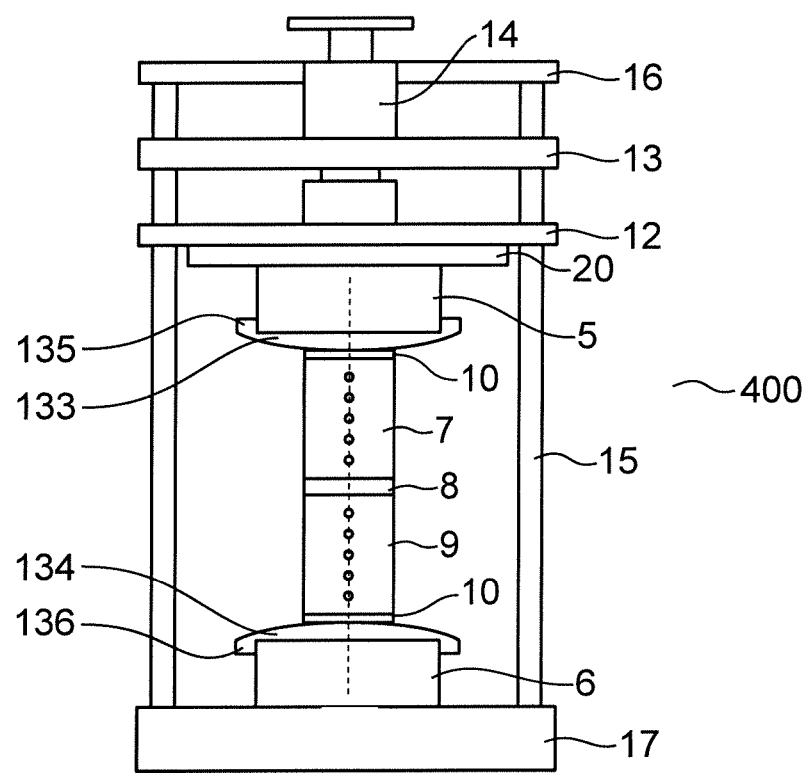
FIG. 13 is a configuration diagram of a thermal conductivity measurement device according to a fourth embodiment of the present invention.

FIG. 13 is a configuration diagram of a thermal conductivity measurement device according to the fourth embodiment of the present invention, generally denoted by 400. In FIG. 13, the same reference numerals as FIG. 9 denote the same or corresponding portions.

The thermal conductivity measurement device 400 includes a heating-side axis correction member 133 and a cooling-side axis correction member 134 instead of the heating-side axis correction member 33 and the cooling-side axis correction member 34, respectively, of the thermal conductivity measurement device 200 according to the second embodiment. The other structure is the same as the thermal conductivity measurement device 200.

Since the heating-side axis correction member 133 and the cooling-side axis correction member 134 have protruding portions 135, 136 as described above, a positional deviation can be prevented when the object to be measured 8 sandwiched between the holding members 7, 9 is placed in the thermal conductivity measurement device 400. As a result, a placement time can be shortened, and measurement can be performed with high accuracy.

The shapes of the protruding portions 135, 136 may be other shapes as described in the third embodiment (e.g., FIGS. 11 and 12).

Fifth Embodiment

Figure 14:
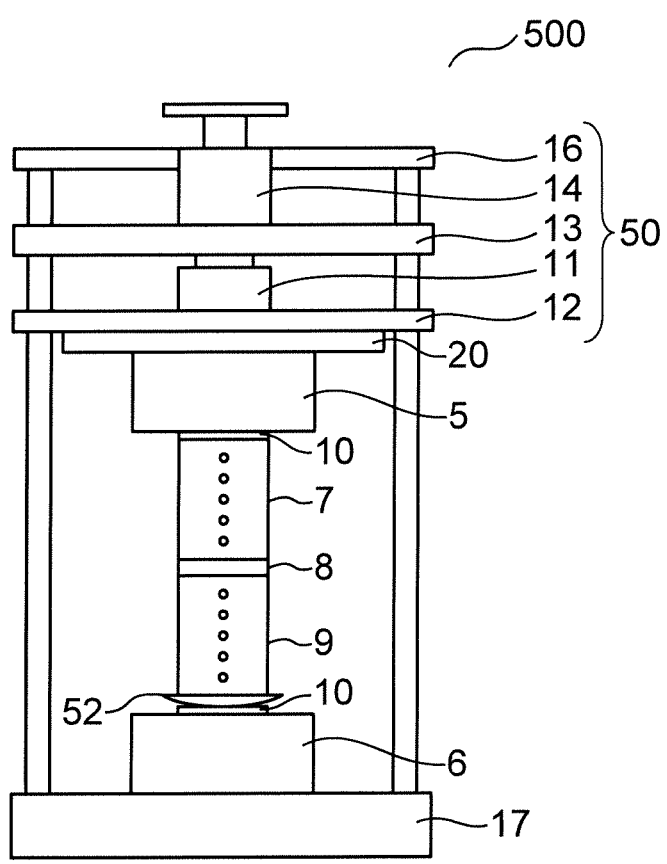
FIG. 14 is a configuration diagram of a thermal conductivity measurement device according to a fifth embodiment of the present invention.
Figure 15:
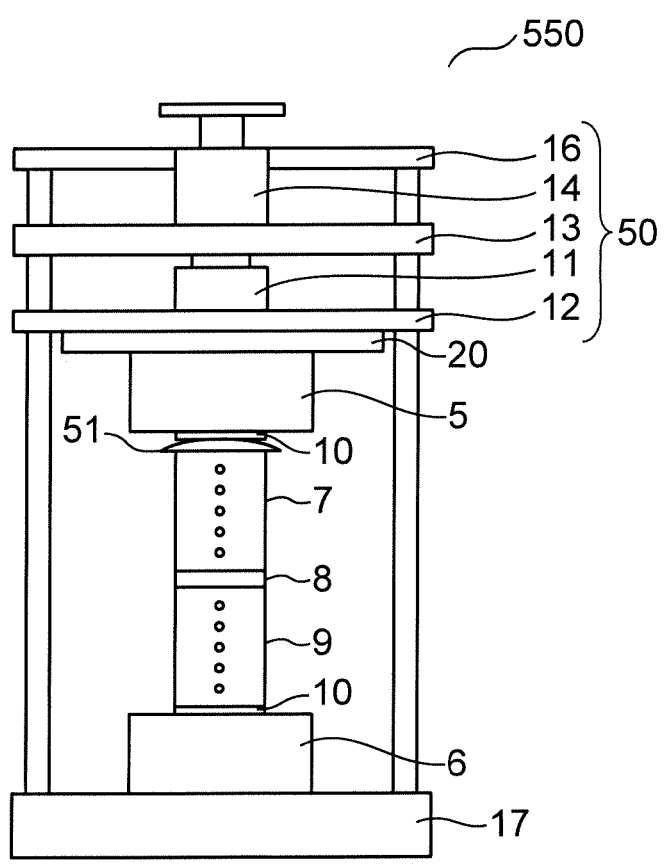
FIG. 15 is a configuration diagram of the thermal conductivity measurement device according to the fifth embodiment of the present invention.

FIGS. 14 and 15 are configuration diagrams of thermal conductivity measurement devices according to the fifth embodiment of the present invention, generally denoted by 500, 550, which are modifications of the thermal conductivity measurement device 110 according to the first embodiment shown in FIG. 2. In FIGS. 14 and 15, the same reference numerals as FIG. 2 denote the same or corresponding portions.

While the thermal conductivity measurement device 110 includes the heating-side axis correction member 51 and the cooling side cooling member 52 respectively disposed both between the heating block unit 5 and the heating-side holding member 7 and between the cooling block unit 6 and the cooling-side holding member 9, the thermal conductivity measurement devices 500, 550 according to the fifth embodiment of the present invention each include either of the members.

Figure 16:
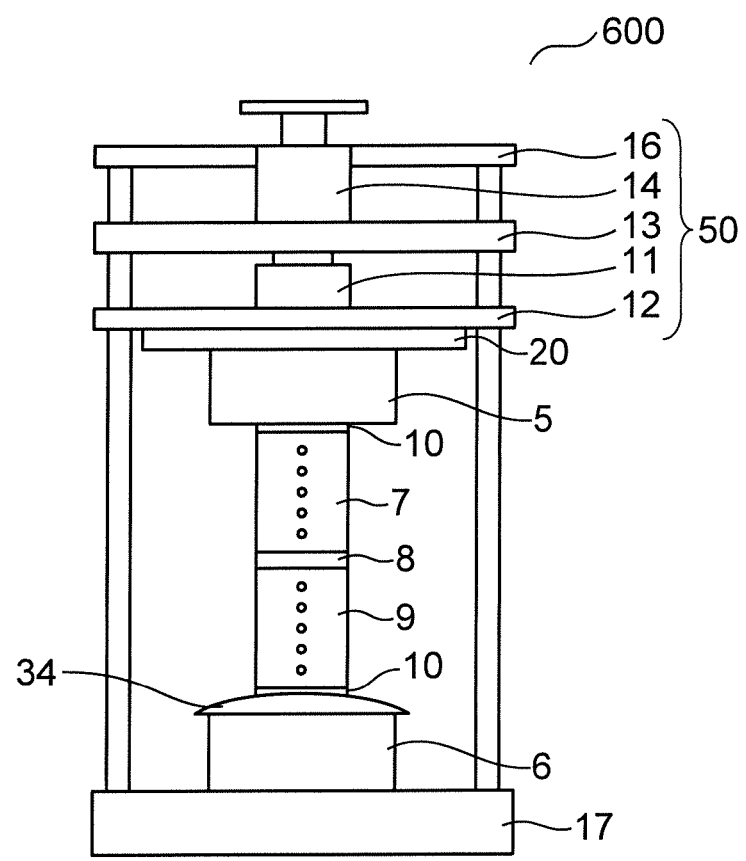
FIG. 16 is a configuration diagram of another thermal conductivity measurement device according to the fifth embodiment of the present invention.
Figure 17:
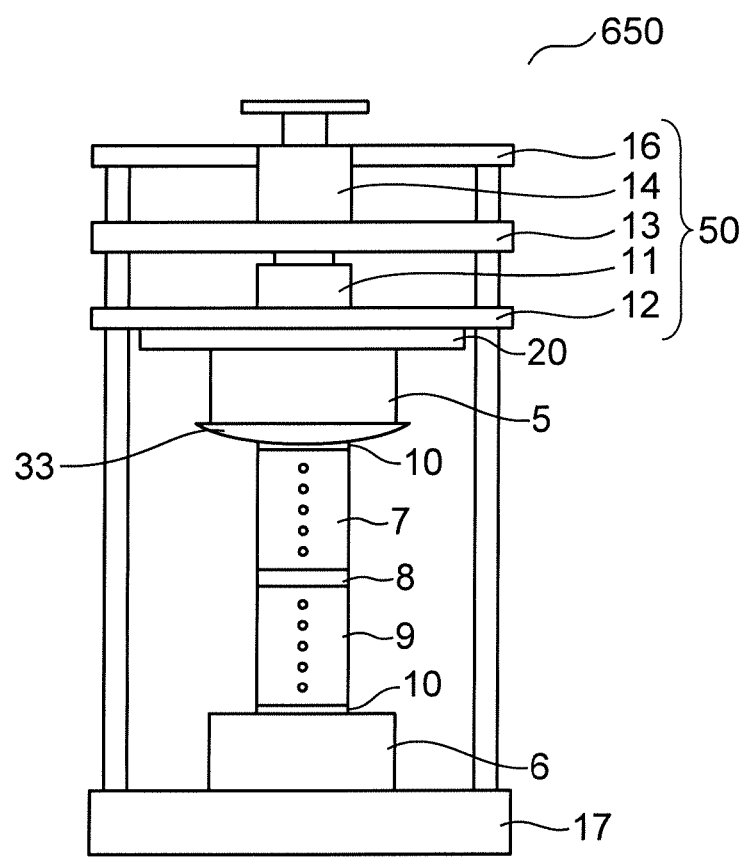
FIG. 17 is a configuration diagram of another thermal conductivity measurement device according to the fifth embodiment of the present invention.

FIGS. 16 and 17 are configuration diagrams of other thermal conductivity measurement devices according to the fifth embodiment of the present invention, generally denoted by 600, 650, which are modifications of the thermal conductivity measurement device 200 according to the second embodiment shown in FIG. 9. In FIGS. 16 and 17, the same reference numerals as FIG. 9 denote the same or corresponding portions.

While the thermal conductivity measurement device 200 includes the heating-side axis correction member 33 and the cooling side cooling member 34 respectively disposed both between the heating block unit 5 and the heating-side holding member 7 and between the cooling block unit 6 and the cooling-side holding member 9, the thermal conductivity measurement devices 600, 650 according to the fifth embodiment of the present invention each include either of the members.

Figure 18:
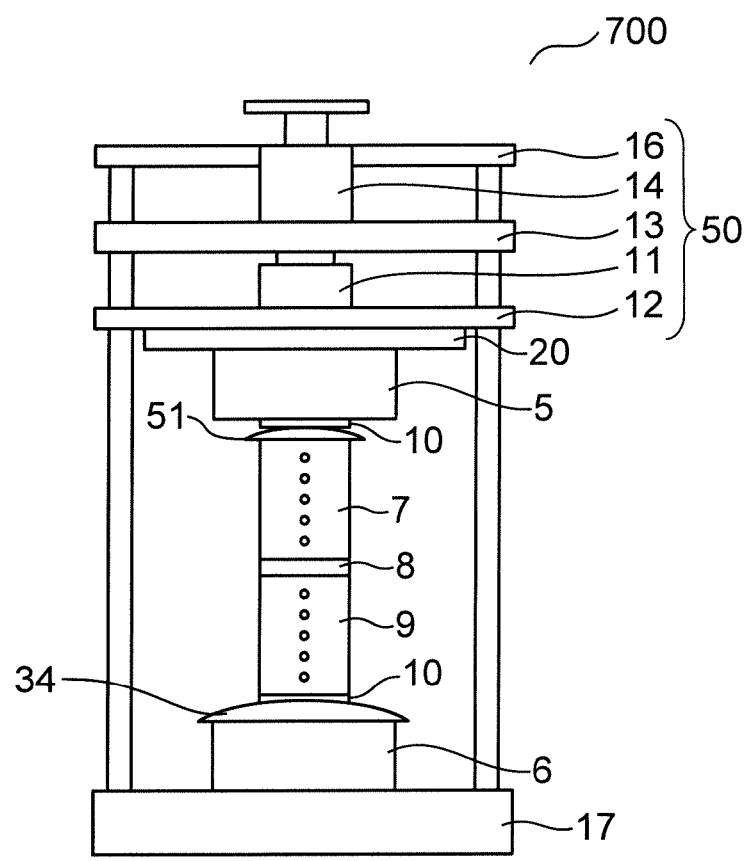
FIG. 18 is a configuration diagram of another thermal conductivity measurement device according to the fifth embodiment of the present invention.
Figure 19:
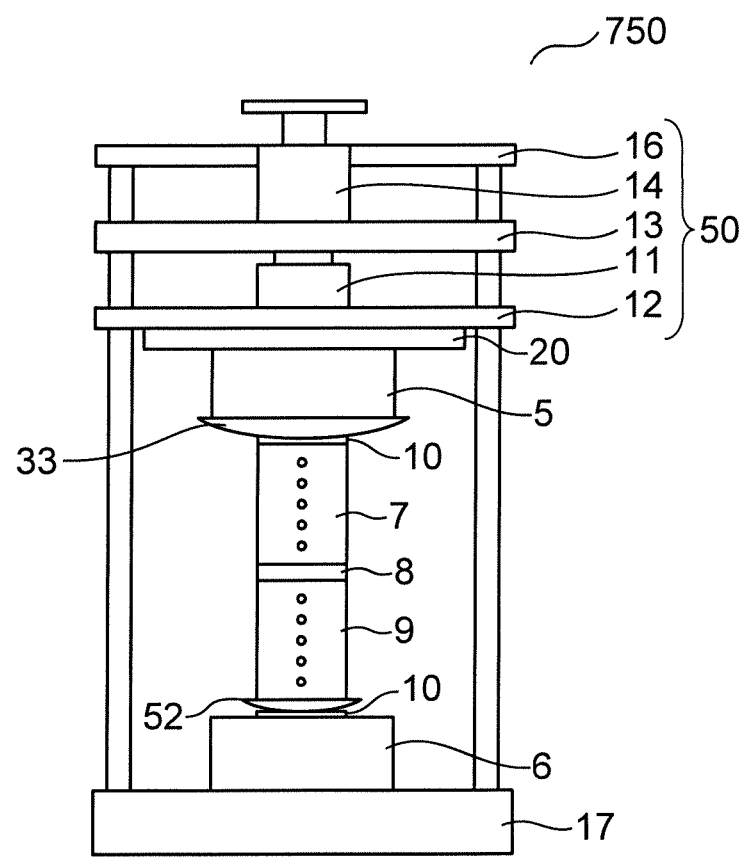
FIG. 19 is a configuration diagram of another thermal conductivity measurement device according to the fifth embodiment of the present invention.

FIGS. 18 and 19 are configuration diagrams of other thermal conductivity measurement devices according to the fifth embodiment of the present invention, generally denoted by 700, 750, which are modifications acquired by combining the thermal conductivity measurement device 110 and the thermal conductivity measurement device 200. In FIGS. 18 and 19, the same reference numerals as FIGS. 2 and 9 denote the same or corresponding portions.

The thermal conductivity measurement device 700 has the heating-side axis correction member 51 disposed between the heating block unit 5 and the heating-side holding member 7 and the cooling-side axis correction member 34 disposed between the cooling block unit 6 and the cooling-side holding member 9. On the other hand, the thermal conductivity measurement device 750 has the heating-side axis correction member 33 disposed between the heating block unit 5 and the heating-side holding member 7 and the cooling-side axis correction member 52 disposed between the cooling block unit 6 and the cooling-side holding member 9.

As with the thermal conductivity measurement devices 500, 550, 600, 650, 700, 750 according to the fifth embodiment of the present invention, one of the heating-side axis correction member 51 and the cooling-side axis correction member 52, one of the heating-side axis correction member 33 and the cooling-side axis correction member 34, or a combination thereof may be used as needed, and such a modification is obviously included in the technical scope of the present invention.

EXPLANATIONS OF LETTERS OR NUMERALS

2 measurement control device, 3 temperature measurement device, 4 thermocouple, 5 heating block unit, 6 cooling block unit, 7 heating-side holding member, 8 object to be measured, 9 cooling-side holding member, 10 thermal conductive grease, 11 load cell, 12 support plate, 13 spacer, 14 pressing force adjustment screw, 15 shaft, 16 upper plate, 17 base, 18 heating block unit control device, 19 cooling block unit control device, 20 heat insulating plate, 21 thickness display device, 25 temperature measurement point, 26 isotherm, 27 pressing force vector, 51 heating-side axis correction member, 52 cooling-side axis correction member, 100 thermal conductivity measurement device.

The invention claimed is:

1. A thermal conductivity measurement device comprising:
   a first holding member including a contact end face coming into contact with an object to be measured and a distal end face disposed on the side opposite to the contact end face;
   a second holding member including a contact end face coming into contact with the object to be measured and a distal end face disposed on the side opposite to the contact end face, the second holding member holding the object to be measured together with the first holding member;
   a heating member including an abutting end face that faces the distal end face of the first holding member and heating the first holding member;
   a cooling member including an abutting end face that faces the distal end face of the second holding member and cooling the second holding member;
   an axis correction member sandwiched at least between the distal end face of the first holding member and the abutting end face of the heating member or between the distal end face of the second holding member and the abutting end face of the cooling member and including two faces facing the distal end face and the abutting end face; and
   a plurality of temperature sensors disposed in the first holding member and the second holding member, wherein
   at least one face of the axis correction member is a curved face having a convex curved shape.

2. The thermal conductivity measurement device according to claim 1, wherein the axis correction member comprises:
   a first axis correction member sandwiched between the distal end face of the first holding member and the abutting end face of the heating member and including two faces facing the distal end face and the contact end face, and a second axis correction member sandwiched between the distal end face of the second holding member and the abutting end face of the cooling member and including two faces facing the distal end face and the contact end face, wherein at least one face of the first axis correction member and at least one face of the second axis correction member are curved faces having a convex curved shape.

3. The thermal conductivity measurement device according to claim 2, wherein the first axis correction member includes a curved face in contact with the heating member, and wherein the second axis correction member includes a curved face in contact with the cooling member.

4. The thermal conductivity measurement device according to claim 2, wherein the first axis correction member includes a curved face in contact with the first holding member, and wherein the second axis correction member includes a curved face in contact with the second holding member.

5. The thermal conductivity measurement device according to claim 2, wherein the first axis correction member includes a curved face in contact with the heating member, and wherein the second axis correction member includes a curved face in contact with the second holding member.

6. The thermal conductivity measurement device according to claim 2, wherein the first axis correction member includes a curved face in contact with the first holding member, and wherein the second axis correction member includes a curved face in contact with the cooling member.

7. The thermal conductivity measurement device according to claim 2, wherein the curved faces have a planar R shape or a spherical R shape.

8. The thermal conductivity measurement device according to claim 1, further comprising:

a pressing force applying mechanism applying a pressing force between the heating member and the cooling member.

9. A thermal conductivity measurement method comprising:

preparing the thermal conductivity measurement device according to claim 8;

sandwiching the object to be measured between the first holding member and the second holding member;

applying a pressing force between the heating member and the cooling member by the pressing force applying mechanism;

heating the first holding member with the heating member and cooling the second holding member with the cooling member; and measuring temperatures of the first holding member and the second holding member with the temperature sensors to detect the thermal conductivity of the object to be measured.

10. A thermal conductivity measurement device comprising:

a first holding member including a contact end face coming into contact with an object to be measured and a distal end face disposed on the side opposite to the contact end face;

a second holding member including a contact end face coming into contact with the object to be measured and a distal end face disposed on the side opposite to the contact end face, the second holding member holding the object to be measured together with the first holding member;

a heating member including an abutting end face that faces the distal end face of the first holding member and heating the first holding member;

a cooling member including an abutting end face that faces the distal end face of the second holding member and cooling the second holding member;

an axis correction member sandwiched at least between the distal end face of the first holding member and the abutting end face of the heating member or between the distal end face of the second holding member and the abutting end face of the cooling member and including two faces facing the distal end face and the abutting end face; and a plurality of temperature sensors disposed in the first holding member and the second holding member, wherein at least one face of the axis correction member is a curved face having a convex curved shape, while the other face is a flat face.

11. The thermal conductivity measurement device according to claim 10, further comprising:

a pressing force applying mechanism applying a pressing force between the heating member and the cooling member.

12. The thermal conductivity measurement device according to claim 10, wherein the axis correction member comprises:

a first axis correction member sandwiched between the distal end face of the first holding member and the abutting end face of the heating member and including two faces facing the distal end face and the contact end face, and a second axis correction member sandwiched between the distal end face of the second holding member and the abutting end face of the cooling member and including two faces facing the distal end face and the contact end face, wherein at least one face of the first axis correction member and at least one face of the second axis correction member are curved faces having a convex curved shape, while the other face of the first axis correction member and the other face of the second axis correction member are each a flat face.

13. The thermal conductivity measurement device according to claim 12, wherein the first axis correction member includes a flat face in contact with the first holding member and a curved face in contact with the heating member, and wherein the second axis correction member includes a flat face in contact with the second holding member and a curved face in contact with the cooling member.

14. The thermal conductivity measurement device according to claim 12, wherein the first axis correction member includes a curved face in contact with the first holding member and a flat face in contact with the heating member, and wherein the second axis correction member includes a curved face in contact with the second holding member and a flat face in contact with the cooling member.

15. The thermal conductivity measurement device according to claim 12, wherein the first axis correction member includes a flat face in contact with the first holding member and a curved face in contact with the heating member, and wherein the second axis correction member includes a curved face in contact with the second holding member and a flat face in contact with the cooling member.

16. The thermal conductivity measurement device according to claim 12, wherein
the first axis correction member includes a curved face in contact with the first holding member and a flat face in contact with the heating member, and wherein
the second axis correction member includes a flat face in contact with the second holding member and a curved face in contact with the cooling member.

17. The thermal conductivity measurement device according to claim 12, wherein the curved faces have a planar R shape or a spherical R shape.

18. The thermal conductivity measurement device according to claim 12, wherein
the flat face of the first axis correction member in contact with the first holding member or the heating member includes a protruding portion coming into contact with a side surface of the first holding member, and wherein
the flat face of the second axis correction member in contact with the second holding member or the cooling member includes a protruding portion coming into contact with a side surface of the second holding member.

19. The thermal conductivity measurement device according to claim 12, wherein
the flat face of the first axis correction member in contact with the first holding member or the heating member includes a protruding portion coming into contact with a side surface of the first holding member, and wherein
the flat face of the second axis correction member in contact with the second holding member or the cooling member includes a protruding portion coming into contact with a side surface of the second holding member.

20. The thermal conductivity measurement device according to claim 19, wherein the protruding portion is disposed along a pair of opposite side surfaces or all the side surfaces of the first holding member or the heating member and is disposed along a pair of opposite side surfaces or all the side surfaces of the second holding member or the cooling member.

\* \* \* \* \*